Oct. 28, 1969    R. L. TOWNSEND ET AL    3,475,724
ERROR CONTROL SYSTEM
Filed Oct. 8, 1965    9 Sheets-Sheet 1

FIG. I

INVENTORS
R. L. TOWNSEND
E. J. WELDON, JR.
BY
Lucian C. Canepa
ATTORNEY

FIG. 4

| COLUMN SUBBLOCK NUMBER, $y$ | ROW SUBBLOCK NUMBER, $w$ | | | |
|---|---|---|---|---|
| | 0 | 1 | ... | $m-1$ |
| 0 | 10111 01001 | 00000 00001 | 00 00 | 00000 00010 |
| 1 | 00000 00010 | 10111 01001 | 00 00  $n_0-k_0=2$ BITS | 00100 00010 |
| | 00 00 | 00 00 $\quad n_0=5$ BITS | . . . | |
| $m-1$ | 00000 00001 | 00010 00100 | 00 00 | 10111 01001 |

FIG. 5A

| $d$ $R=1/2$ | $n$ | CHECK DIGIT SPECIFIER |
|---|---|---|
| 3 | 6 | (1,2) |
| 4 | 14 | (1,2,4) |
| 5 | 26 | (1,2,4,10) |
| 6 | 42 | (1,2,5,15,17) |
| 7 | 62 | (1,2,4,9,13,19) |
| 8 | 102 | (1,2,4,8,13,21,31) |
| 9 | 114 | (1,2,4,14,33,37,44,53) |
| 11 | 182 | (1,2,4,10,28,50,57,62,78) |
| 13 | 266 | (1,2,4,13,21,35,39,82,89,95,105,110) |
| 15 | 366 | (1,2,4,17,24,29,43,77,83,87,120,138,155,176) |

FIG. 5C

| d | | n | CHECK DIGIT SPECIFIER |
|---|---|---|---|
| R=1/4 | R=3/4 | | |
| 7 | 3 | 28 | (1,2) |
| | | | (1,3) |
| | | | (1,4) |
| 10 | 4 | 39 | (1,2,6) |
| | | | (1,3,9) |
| | | | (1,4,11) |
| 13 | 5 | 156 | (1,2,7,11) |
| | | | (1,14,17,25) |
| | | | (1,8,20,22) |
| 16 | 6 | 296 | (1,15,20,26,35) |
| | | | (1,19,23,36,52) |
| | | | (1,8,9,11,39) |
| 19 | 7 | 420 | (1,13,17,43,49,62) |
| | | | (1,39,42,44,53,73) |
| | | | (1,16,23,24,41,51) |
| 22 | 8 | 580 | (1,2,22,25,53,58,70) |
| | | | (1,7,11,33,41,48,91) |
| | | | (1,14,28,30,39,74,92) |
| 25 | 9 | 836 | (1,21,30,43,54,66,73,101) |
| | | | (1,11,38,52,55,70,86,143) |
| | | | (1,22,26,27,82,88,90,128) |
| 31 | 11 | 1380 | (1,16,36,43,49,73,87,133,150,189) |
| | | | (1,86,94,120,152,156,181,199,248,264) |
| | | | (1,41,46,69,100,110,119,121,22,210) |

FIG. 5B

| d | | n | CHECK DIGIT SPECIFIER |
|---|---|---|---|
| R=1/3 | R=2/3 | | |
| 5 | 3 | 15 | (1,2) |
| | | | (1,3) |
| 7 | 4 | 39 | (1,2,5) |
| | | | (1,3,8) |
| 9 | 5 | 78 | (1,2,4,10) |
| | | | (1,5,12,17) |
| 11 | 6 | 135 | (1,4,6,14,18) |
| | | | (1,12,21,27,28) |
| 13 | 7 | 201 | (1,2,10,20,25,32) |
| | | | (1,5,7,18,21,47) |
| 15 | 8 | 315 | (1,13,32,34,45,49,52) |
| | | | (1,24,29,30,38,54,64) |
| 17 | 9 | 420 | (1,20,27,37,49,60,69,74) |
| | | | (1,51,57,59,72,75,102,103) |
| 21 | 11 | 681 | (1,2,9,33,38,59,73,82,84,136) |
| | | | (1,14,17,34,44,56,62,103,118,122) |
| 25 | 13 | 1041 | (1,17,28,54,72,82,101,122,142,167,184,199) |
| | | | (1,24,57,87,88,91,93,100,139,197,211,219) |

FIG. 5E

| d | | n | CHECK DIGIT SPECIFIER |
|---|---|---|---|
| R=1/6 | R=5/6 | | |
| 11 | 3 | 66 | (1, 2)<br>(1, 3)<br>(1, 4)<br>(1, 5)<br>(1, 6) |
| 16 | 4 | 186 | (1, 2, 15)<br>(1, 3, 9)<br>(1, 4, 13)<br>(1, 5, 12)<br>(1, 6, 16) |
| 21 | 5 | 390 | (1, 2, 21, 27)<br>(1, 3, 25, 33)<br>(1, 4, 14, 32)<br>(1, 5, 16, 28)<br>(1, 6, 15, 22) |
| 26 | 6 | 702 | (1, 43, 44, 61, 68)<br>(1, 29, 31, 45, 66)<br>(1, 37, 40, 50, 59)<br>(1, 30, 34, 42, 57)<br>(1, 41, 46, 52, 72) |
| 31 | 7 | 1176 | (1, 43, 44, 61, 68, 18)<br>(1, 35, 63, 65, 79, 100)<br>(1, 54, 90, 93, 103, 112)<br>(1, 30, 34, 42, 57, 89)<br>(1, 41, 46, 52, 72, 128) |

FIG. 5D

| d | | n | CHECK DIGIT SPECIFIER |
|---|---|---|---|
| R=1/5 | R=4/5 | | |
| 9 | 3 | 45 | (1, 2)<br>(1, 3)<br>(1, 4)<br>(1, 5) |
| 13 | 4 | 125 | (1, 2, 13)<br>(1, 3, 10)<br>(1, 4, 9)<br>(1, 5, 11) |
| 17 | 5 | 265 | (1, 2, 6, 22)<br>(1, 3, 11, 26)<br>(1, 10, 13, 27)<br>(1, 7, 14, 25) |
| 21 | 6 | 460 | (1, 14, 15, 26, 58)<br>(1, 16, 18, 24, 54)<br>(1, 17, 20, 27, 48)<br>(1, 19, 23, 28, 52) |
| 25 | 7 | 695 | (1, 19, 25, 53, 64, 79)<br>(1, 3, 36, 45, 50, 67)<br>(1, 11, 41, 49, 78, 99)<br>(1, 37, 44, 56, 57, 60) |
| 29 | 8 | 1205 | (1, 59, 72, 102, 116, 147, 152)<br>(1, 3, 11, 20, 38, 87, 134)<br>(1, 62, 110, 126, 130, 151, 204)<br>(1, 4, 27, 33, 55, 66, 67) |
| 33 | 9 | 1460 | (1, 50, 106, 119, 126, 130, 193, 218)<br>(1, 45, 47, 63, 66, 78, 104, 136)<br>(1, 29, 52, 69, 79, 124, 133, 163)<br>(1, 15, 86, 94, 123, 128, 129, 176) |

FIG. 6

R = 1/2   d = 5
(26, 13) CODE

| PARITY CHECK DIGITS | INFORMATION DIGITS | | | | | | | | | | | | |
|---|---|---|---|---|---|---|---|---|---|---|---|---|
| | I1 | I2 | I3 | I4 | I5 | I6 | I7 | I8 | I9 | I10 | I11 | I12 | I13 |
| C1 | 1 | 1 | 0 | 1 | 0 | 0 | 0 | 0 | 0 | 1 | 0 | 0 | 0 |
| C2 | 0 | 1 | 1 | 0 | 1 | 0 | 0 | 0 | 0 | 0 | 1 | 0 | 0 |
| C3 | 0 | 0 | 1 | 1 | 0 | 1 | 0 | 0 | 0 | 0 | 0 | 1 | 0 |
| C4 | 0 | 0 | 0 | 1 | 1 | 0 | 1 | 0 | 0 | 0 | 0 | 0 | 1 |
| C5 | 1 | 0 | 0 | 0 | 1 | 1 | 0 | 1 | 0 | 0 | 0 | 0 | 0 |
| C6 | 0 | 1 | 0 | 0 | 0 | 1 | 1 | 0 | 1 | 0 | 0 | 0 | 0 |
| C7 | 0 | 0 | 1 | 0 | 0 | 0 | 1 | 1 | 0 | 1 | 0 | 0 | 0 |
| C8 | 0 | 0 | 0 | 1 | 0 | 0 | 0 | 1 | 1 | 0 | 1 | 0 | 0 |
| C9 | 0 | 0 | 0 | 0 | 1 | 0 | 0 | 0 | 1 | 1 | 0 | 1 | 0 |
| C10 | 0 | 0 | 0 | 0 | 0 | 1 | 0 | 0 | 0 | 1 | 1 | 0 | 1 |
| C11 | 1 | 0 | 0 | 0 | 0 | 0 | 1 | 0 | 0 | 0 | 1 | 1 | 0 |
| C12 | 0 | 1 | 0 | 0 | 0 | 0 | 0 | 1 | 0 | 0 | 0 | 1 | 1 |
| C13 | 1 | 0 | 1 | 0 | 0 | 0 | 0 | 0 | 1 | 0 | 0 | 0 | 1 |

FIG. 7

FIXED THRESHOLD DECODING
(DIGITS I1 AND I4 RECEIVED IN ERROR)

| SHIFT NO. | CONTENTS OF SYNDROME REGISTER | | | | | | | | | | | | | OUTPUT OF GATE 221 | CORRECTION SIGNAL ? |
|---|---|---|---|---|---|---|---|---|---|---|---|---|---|---|---|
| | S13 | S12 | S11 | S10 | S9 | S8 | S7 | S6 | S5 | S4 | S3 | S2 | S1 | | |
| | 1 | 0 | 1 | 0 | 0 | 1 | 0 | 0 | 1 | 1 | 1 | 0 | 0 | I1 | YES |
| 1 | | 0 | | 0 | 0 | 1 | 0 | 0 | | 1 | 1 | 0 | | I2 | NO |
| 2 | | 1 | | 1 | 0 | 0 | 1 | 0 | | 1 | 1 | 1 | | I3 | NO |
| 3 | | 0 | 0 | | 0 | 1 | 0 | 0 | 1 | | 0 | 1 | | I4 | YES |
| 4 | | 0 | 0 | 1 | 0 | 1 | 0 | 0 | | 0 | 0 | 1 | | I5 | NO |
| 5 | | 1 | 0 | 0 | 1 | 0 | 1 | 0 | | 1 | 0 | 0 | | I6 | NO |
| 6 | | 1 | 1 | 0 | 0 | 1 | 0 | 1 | | 0 | 1 | 0 | | I7 | NO |
| 7 | 0 | 1 | 1 | 1 | 0 | 0 | 1 | 0 | | 0 | 0 | 1 | | I8 | NO |
| 8 | 0 | 0 | 1 | 1 | 1 | 0 | 0 | 1 | | 1 | 0 | 0 | | I9 | NO |
| 9 | 1 | 0 | 0 | 1 | 1 | 1 | 1 | 0 | | 1 | 0 | 1 | | I10 | NO |
| 10 | 0 | 1 | 0 | 0 | 1 | 1 | 1 | 1 | | 0 | 1 | 0 | | I11 | NO |
| 11 | 0 | 0 | 1 | 0 | 0 | 1 | 1 | 1 | | 0 | 0 | 1 | | I12 | NO |
| 12 | | 0 | 1 | | 0 | 1 | 0 | 0 | 1 | | 1 | 0 | 0 | I13 | NO |

FIG. 8

FIXED THRESHOLD DECODING
(DIGITS I1, I2 AND I4 RECEIVED IN ERROR)

| SHIFT NO. | CONTENTS OF SYNDROME REGISTER | | | | | | | | | | | | | OUTPUT OF GATE 221 | CORRECTION SIGNAL? |
|---|---|---|---|---|---|---|---|---|---|---|---|---|---|---|---|
| | S13 | S12 | S11 | S10 | S9 | S8 | S7 | S6 | S5 | S4 | S3 | S2 | S1 | | |
|  | 1 | 1 | 1 | 0 | 0 | 1 | 0 | 1 | 1 | 1 | 1 | 1 | 1 | I1 | YES |
| 1 |  | 1 |  | 0 | 0 | 1 | 0 | 1 |  | 1 | 1 | 1 |  | I2 | YES |
| 2 |  | 1 |  | 1 | 0 | 0 | 1 | 0 |  | 1 | 1 | 1 |  | I3 | YES |
| 3 |  | 1 |  | 1 | 1 | 1 | 0 | 0 |  | 0 | 1 | 1 |  | I4 | YES |
| 4 |  | 1 |  | 1 | 1 | 1 | 1 | 0 |  | 1 | 0 | 1 |  | I5 | YES |
| 5 |  | 1 |  | 1 | 1 | 1 | 1 | 1 |  | 0 | 1 | 0 |  | I6 | YES |
| 6 |  | 1 |  | 1 | 1 | 1 | 1 | 1 |  | 0 | 0 | 1 |  | I7 | YES |
| 7 | 0 | 1 |  | 1 | 1 | 1 | 1 | 1 |  | 1 | 0 | 0 |  | I8 | YES |
| 8 | 1 | 0 |  | 1 | 1 | 1 | 1 | 1 |  | 1 | 1 | 0 | 0 | I9 | YES |
| 9 | 0 | 1 | 0 | 1 | 1 | 1 | 1 | 1 |  | 1 | 1 | 1 | 0 | I10 | NO |
| 10 | 0 | 0 |  | 0 | 1 | 1 | 1 | 1 |  | 1 | 1 | 1 |  | I11 | YES |
| 11 |  | 0 |  | 1 | 0 | 1 | 1 | 1 |  | 1 | 1 | 1 |  | I12 | YES |
| 12 |  | 1 |  | 0 | 1 | 0 | 1 | 1 |  | 1 | 1 | 1 |  | I13 | YES |

FIG. 9

MODIFIED FIXED THRESHOLD DECODING
(DIGITS I1, I2 AND I4 RECEIVED IN ERROR)

| ROW NO. | SHIFT NO. | CONTENTS OF SYNDROME REGISTER | | | | | | | | | | | | | OUTPUT OF GATE 221 | CORRECTION SIGNAL? |
|---|---|---|---|---|---|---|---|---|---|---|---|---|---|---|---|---|
| | | S13 | S12 | S11 | S10 | S9 | S8 | S7 | S6 | S5 | S4 | S3 | S2 | S1 | | |
| 1 |  | 1 | 1 | 1 | 0 | 0 | 1 | 0 | 1 | 1 | 1 | 1 | 1 | 1 | | |
| 2 |  |  | 1 |  | 0 | 0 | 1 | 0 | 1 |  | 1 | 1 | 1 |  | I1 | YES |
| 3 | (INV.) | 0 | 1 | 0 | 0 | 0 | 1 | 0 | 1 | 0 | 1 | 1 | 1 | 0 | – | – |
| 4 | 1 |  | 0 |  | 0 | 0 | 0 | 1 | 0 |  | 0 | 1 | 1 |  | I2 | YES |
| 5 | (INV.) | 1 | 0 | 0 | 0 | 0 | 0 | 1 | 0 | 0 | 0 | 1 | 1 | 0 | – | – |
| 6 | 2 |  | 1 |  | 0 | 0 | 0 | 0 | 1 |  | 0 | 0 | 1 |  | I3 | NO |
| 7 | 3 |  | 0 |  | 0 | 0 | 0 | 0 | 0 |  | 0 | 0 | 0 |  | I4 | YES |
| 8 | (INV.) | 0 | 0 | 0 | 0 | 0 | 0 | 0 | 0 | 0 | 0 | 0 | 0 | 0 | – | – |
| 9 | 4 |  | 0 |  | 0 | 0 | 0 | 0 | 0 |  | 0 | 0 | 0 |  | I5 | NO |
| 10 | 5 |  | 0 |  | 0 | 0 | 0 | 0 | 0 |  | 0 | 0 | 0 |  | I6 | NO |
| 11 | 6 |  | 0 |  | 0 | 0 | 0 | 0 | 0 |  | 0 | 0 | 0 |  | I7 | NO |
| 12 | 7 |  | 0 |  | 0 | 0 | 0 | 0 | 0 |  | 0 | 0 | 0 |  | I8 | NO |
| 13 | 8 |  | 0 |  | 0 | 0 | 0 | 0 | 0 |  | 0 | 0 | 0 |  | I9 | NO |
| 14 | 9 |  | 0 |  | 0 | 0 | 0 | 0 | 0 |  | 0 | 0 | 0 |  | I10 | NO |
| 15 | 10 |  | 0 |  | 0 | 0 | 0 | 0 | 0 |  | 0 | 0 | 0 |  | I11 | NO |
| 16 | 11 |  | 0 |  | 0 | 0 | 0 | 0 | 0 |  | 0 | 0 | 0 |  | I12 | NO |
| 17 | 12 |  | 0 |  | 0 | 0 | 0 | 0 | 0 |  | 0 | 0 | 0 |  | I13 | NO |

VARIABLE THRESHOLD DECODING
(DIGITS I2, I3 AND I5 RECEIVED IN ERROR)

| ROW NO. | THRES-HOLD LEVEL | SHIFT NO. | S13 | S12 | S11 | S10 | S9 | S8 | S7 | S6 | S5 | S4 | S3 | S2 | S1 | INPUT TO CCT. 325 | CORREC-TION SIGNAL? |
|---|---|---|---|---|---|---|---|---|---|---|---|---|---|---|---|---|---|
| 1 | | | 1 | 1 | 0 | 0 | 1 | 0 | 1 | 1 | 1 | 1 | 1 | 1 | 1 | | |
| 2 | 4 | | | 1 | | 0 | 1 | 0 | 1 | 1 | | 1 | 1 | 1 | | I1 | NO |
| 3 | 4 | 1 | | 1 | | 0 | 0 | 1 | 0 | 1 | | 1 | 1 | 1 | | I2 | YES |
| 4 | — | (INV.) | 0 | 1 | 0 | 0 | 0 | 1 | 0 | 1 | 0 | 1 | 1 | 1 | 0 | — | — |
| 5 | 4 | 1 | | 0 | | 0 | 0 | 0 | 1 | 0 | | 0 | 1 | 1 | | I3 | NO |
| 6 | 4 | 2 | | 0 | | 1 | 0 | 0 | 0 | 1 | | 1 | 0 | 1 | | I4 | NO |
| 7 | 4 | 3 | | 1 | | 0 | 1 | 0 | 0 | 0 | | 0 | 1 | 0 | | I5 | NO |
| 8 | 4 | 4 | | 1 | | 0 | 0 | 1 | 0 | 0 | | 1 | 0 | 1 | | I6 | NO |
| 9 | 4 | 5 | 0 | 1 | | 1 | 0 | 0 | 1 | 0 | | 0 | 1 | 0 | | I7 | NO |
| 10 | 4 | 6 | | 0 | | 1 | 1 | 0 | 0 | 1 | | 0 | 0 | 1 | | I8 | NO |
| 11 | 4 | 7 | | 1 | | 0 | 1 | 1 | 0 | 0 | | 0 | 0 | 0 | | I9 | NO |
| 12 | 4 | 8 | | 0 | | 1 | 0 | 1 | 1 | 0 | | 1 | 0 | 0 | | I10 | NO |
| 13 | 4 | 9 | | 1 | | 0 | 1 | 0 | 1 | 1 | | 0 | 1 | 0 | | I11 | NO |
| 14 | 4 | 10 | | 0 | | 0 | 1 | 0 | 1 | 1 | | 0 | 0 | 1 | | I12 | NO |
| 15 | 4 | 11 | | 0 | | 1 | 0 | 1 | 0 | 1 | | 1 | 0 | 0 | | I13 | NO |
| 16 | 4 | 12 | | 0 | | 0 | 1 | 0 | 1 | 0 | | 1 | 1 | 0 | | I1 | NO |
| 17 | 4 | 13 | | 1 | | 0 | 0 | 1 | 0 | 1 | | 1 | 1 | 1 | | I2 | NO |
| 18 | 3 | 1 | | 0 | | 0 | 0 | 0 | 1 | 0 | | 0 | 1 | 1 | | I3 | YES |
| 19 | — | (INV.) | 1 | 0 | 0 | 0 | 0 | 0 | 1 | 0 | 0 | 0 | 1 | 1 | 0 | — | — |
| 20 | 4 | 1 | | 1 | | 0 | 0 | 0 | 0 | 1 | | 0 | 0 | 1 | | I4 | NO |
| 21 | 4 | 2 | | 0 | | 0 | 0 | 0 | 0 | 0 | | 0 | 0 | 0 | | I5 | YES |
| 22 | — | (INV.) | 0 | 0 | 0 | 0 | 0 | 0 | 0 | 0 | 0 | 0 | 0 | 0 | 0 | — | — |
| 23 | 4 | 1 | | 0 | | 0 | 0 | 0 | 0 | 0 | | 0 | 0 | 0 | | I6 | NO |
| 24 | ⋮ | ⋮ | | | | | | | | | | | | | | ⋮ | ⋮ |
| 25 | 4 | 13 | | 0 | | 0 | 0 | 0 | 0 | 0 | | 0 | 0 | 0 | | I5 | NO |
| 26 | 3 | 1 | | 0 | | 0 | 0 | 0 | 0 | 0 | | 0 | 0 | 0 | | I6 | NO |
| | 3 | | | | | | | | | | | | | | | | |

United States Patent Office 3,475,724
Patented Oct. 28, 1969

3,475,724
ERROR CONTROL SYSTEM
Richard L. Townsend, Westfield, and Edward J. Weldon, Jr., Eatontown, N.J., assignors to Bell Telephone Laboratories, Incorporated, New York, N.Y., a corporation of New York
Filed Oct. 8, 1965, Ser. No. 494,047
Int. Cl. G06f 11/00
U.S. Cl. 340—146.1                     13 Claims

ABSTRACT OF THE DISCLOSURE

An automatic error-correcting system is based on the formulation of a new class of linear block codes. These codes, which are quasi-cyclic and self-orthogonal in nature, are so structured that the coding and decoding circuitry therefor is easily implemented.

---

This invention relates to digital information processing systems and more particularly to the automatic correction of errors in such systems.

The problem of correctly transmitting binary signals over a noisy channel is a significant one whose solution has been actively sought. Some illustrative situations in which this problem arises are: when telephone lines subject to error impulses are being used to transmit data in binary form; when an imperfect medium such as magnetic tape or a photographic emulsion is used to store binary data; or when operations on binary signals are being carried out by means of circuits constructed of devices such as relays, diodes, or transistors, which have a probability of error.

Error control systems can be classified generally into two major categories. One category includes systems of the type in which decoding circuitry detects the occurrence of erroneous digits and, in response thereto, signals associated transmitting equipment to retransmit the erroneously-received signals.

The other major category of error control systems involves the use of various techniques of redundancy. By means of such techniques, it is possible to encode binary information signals to be transmitted in such a way that a decoder is able to extract the original information content therefrom with a high degree of reliability despite the fact that the information signals may have been mutilated to some limited extent during transmission.

A number of redundant error-correcting systems have embodied therein a parity check digit concept. A parity check digit is a digit added to a group of binary information digits to make the sum of the information and check digits always odd (or even) in accordance with a predetermined decision. Illustrative of the error-correcting systems which employ parity checks as the basis for identifying erroneous digits therein are those disclosed in R. W. Hamming–B. D. Holbrook, Reissue Patent 23,601, issued Dec. 23, 1952.

An object of the present invention is to improve information processing systems.

More specifically, an object of this invention is to provide an improved error-correcting system of the parity type.

Another object of the present invention is to provide an automatic error-correcting system characterized by ease of implementation.

Yet another object of this invention is to provide relatively simple and reliable systems for automatically correcting prescribed classes of randomly-occurring errors.

These and other objects of the present invention are realized in a specific illustrative system embodiment thereof that includes an encoder and a decoder interconnected by a noisy communication channel. Equal-length blocks or sequences of information digit signals to be transmitted are each encoded by deriving therefrom a parity check digit sequence. Each information block with its associated parity sequence appended thereto is applied to the channel for transmission to the decoder. At the decoder a parity sequence is recalculated from each received information sequence. This recalculated sequence is then combined with the corresponding received parity sequence to form a so-called syndrome word. In turn, threshold circuitry processes the syndrome word and determines therefrom whether or not the individual digits of the received information sequence require correction before being transferred to an output utilization circuit. Correction is actually accomplished simply by inverting any information digits determined to be in error.

An error control system made in accordance with the principles of the present invention embodies therein a new class of linear block codes which, for reasons that will be set forth in detail later hereinbelow, are called quasi-cyclic and self-orthogonal. These novel codes possess unique properties that enable the encoding and decoding circuitry of the system to be implemented in a remarkably simple manner.

An illustrative encoder made in accordance with the invention includes a $k$-stage shift register to the input stage of which are applied in sequence $k$-digit blocks of binary information digits. Connected to selected stages of the register is a check circuit which generates a group of $n-k$ parity signals. The generation of parity check signals is accomplished as the information block is cyclically permuted in the shift register via a direct feedback path that interconnects the first and last stages thereof. Subsequently, the generated parity signals are appended to their corresponding information block to form an $n$-digit redundant sequence which is applied to the channel for transmission to the decoder.

The aforementioned partity check signals are respectively derived from the information signals successively stored in a selected set of stages of the encoding shift register. Each check signal and the associated information signals determinative thereof will be referred to herein as a check group. In accordance with the invention, the derivation of parity check signals is carried out in a manner such that when all the check groups including a particular information digit signal are regarded as a class, no digit other than the particular digit is common to two or more check groups of the class. This property is that of self-orthogonality.

At the decoder the information and parity check sequences are processed in the manner described above to generate an $(n-k)$-digit syndrome word which is stored in an $(n-k)$-stage feedback shift register. In addition, the received information sequence is stored in a k-stage feedback shift register. Threshold circuitry responsive to the states of a selected set of stages of the syndrome register is adjusted to provide a correction signal if more than half plus one of the selected stages are determined to be in their "1" states. As the information and syndrome registers are shifted cyclically in synchronism, successive information digits abstracted from the information register are inverted or not depending respectively on whether or not a corresponding correction signal in supplied by the threshold circuitry. In this way, up to a prescribed maximum number of erroneous information digits are automatically corrected before being supplied to an output utilization circuit.

In accordance with an alternative embodiment of the principles of the present invention, the error-correcting capabilities of the noted system are improved in a substantial manner. In this alternative embodiment the states of the selected stages of the syndrome shift register are respectively inverted each time that the threshold circuitry provides a correction signal. By this technique a substantial number of error patterns that each include more than the prescribed maximum number of errors, can be detected and corrected.

In a still further embodiment of this invention the threshold level of the above-mentioned threshold circuitry is made variable. By controlling this level in a predetermined manner in response to the occurrence of correction signals, and to the occurrence of shift signals applied to the syndrome register, it is possible to automatically correct additional error patterns which cannot be effectively controlled by the fixed-threshold embodiments described above.

It is therefore a feature of the present invention that the encoder of a block code error-correcting system include a parity circuit for generating check digits each of which is a member of a set of self-orthogonal check groups.

It is another feature of this invention that the encoder of such a system include a $k$-stage shift register to whose input stage $k$ information digits are applied in sequence; that the register include a feedback path interconnecting the input and output stages thereof; that the encoder also include a parity circuit whose inputs are derived from selected stages of said register for generating check digits each of which that is derived from a common information digit is a member of a set of self-orthogonal check groups; and that the register be cyclically shifted $n-k$ times to enable the parity circuit to generate $n-k$ distinct check digits which are combined with the k information digits and applied to a noisy channel for transmission to a decoder.

It is a further feature of the present invention that the decoder of a block code error-correcting system include circuitry responsive to each received information-check sequence for deriving therefrom a syndrome word, and that the decoder further include circuitry responsive to at least a predetermined number of a prescribed set of syndrome digits being of a particular binary character for generating a correction signal.

It is a still further feature of this invention that the decoder thereof include additional circuitry responsive to the occurrence of a correction signal for inverting all the syndrome digits included in the prescribed set.

Yet another feature of the present invention is that the decoder thereof include circuitry for varying the requirement as to the number of digits in the prescribed set which must be of a particular binary character to result in the generation of a correction signal.

A complete understanding of the present invention and of the above and other features and advantages thereof may be gained from a consideration of the following detailed description of several illustrative embodiments thereof presented hereinbelow in connection with the accompanying drawings, in which:

FIG. 4 is a generalized matrix representation of a block code;

Figure 2:
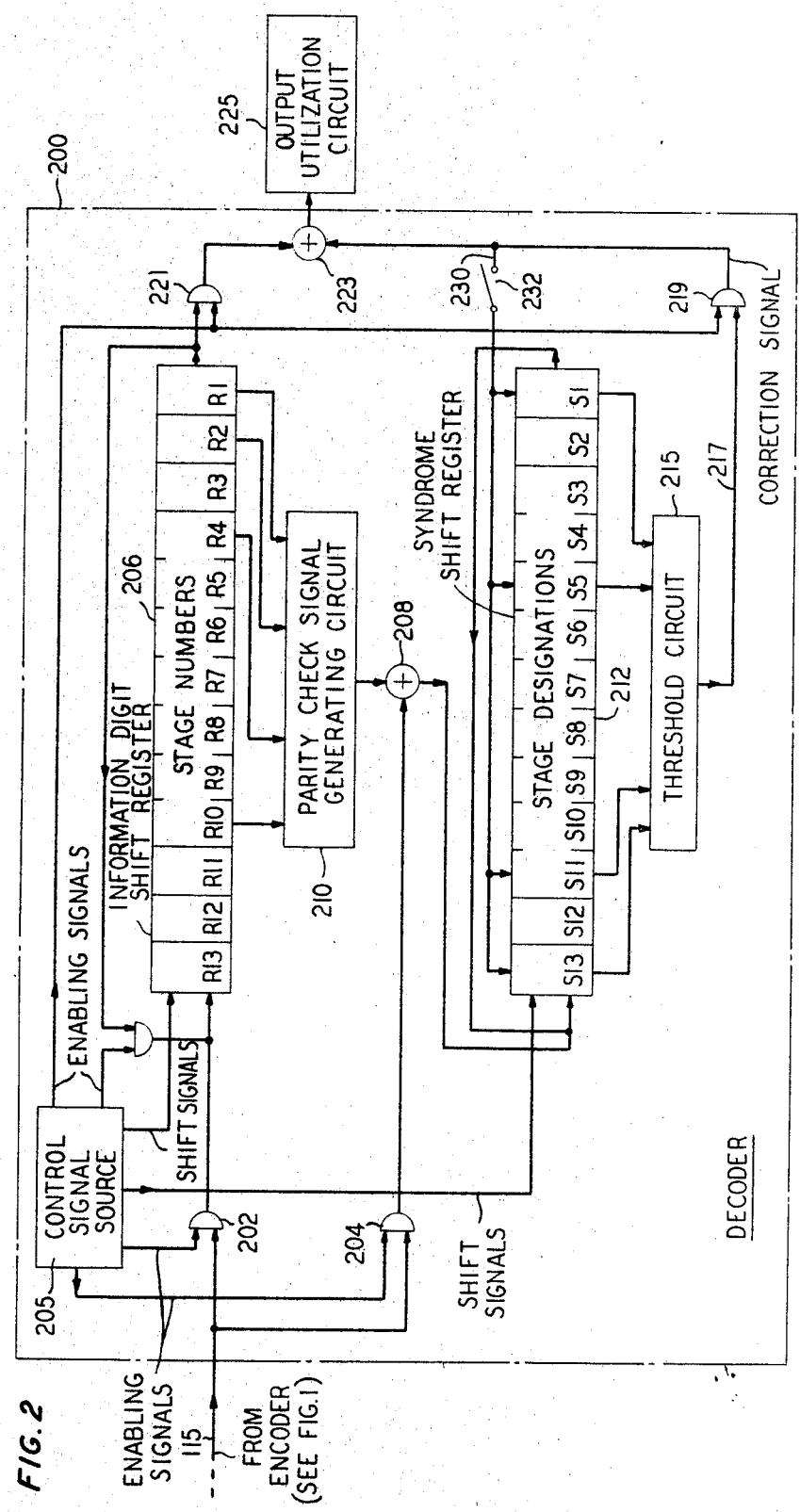
FIG. 2 shows a specific illustrative fixed-threshold block code decoder which embodies the principles of this invention.
Figure 3:
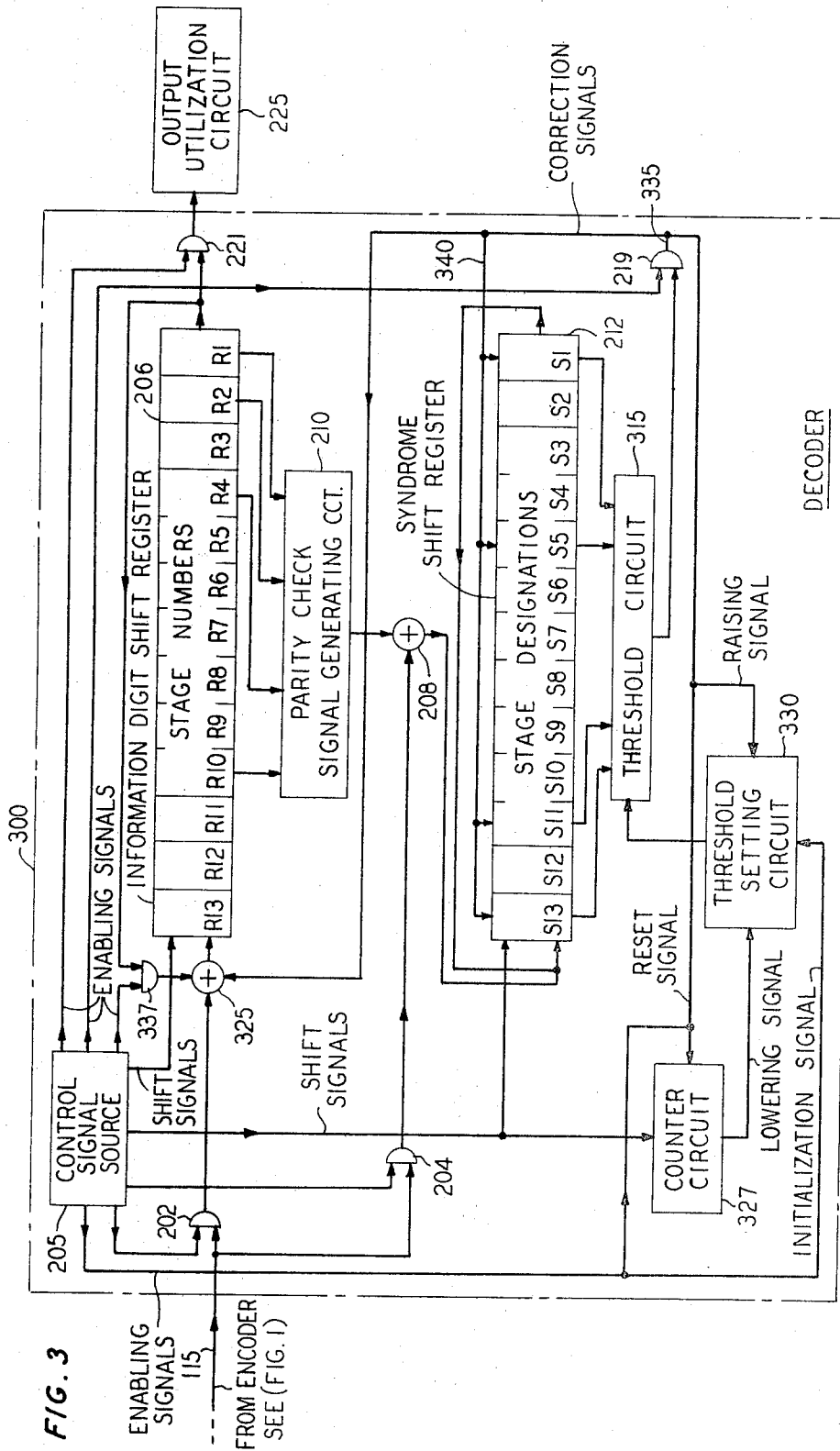
FIG. 3 shows a specific illustrative variable-threshold decoder made in accordance with the invention.
Figures 10, 11:
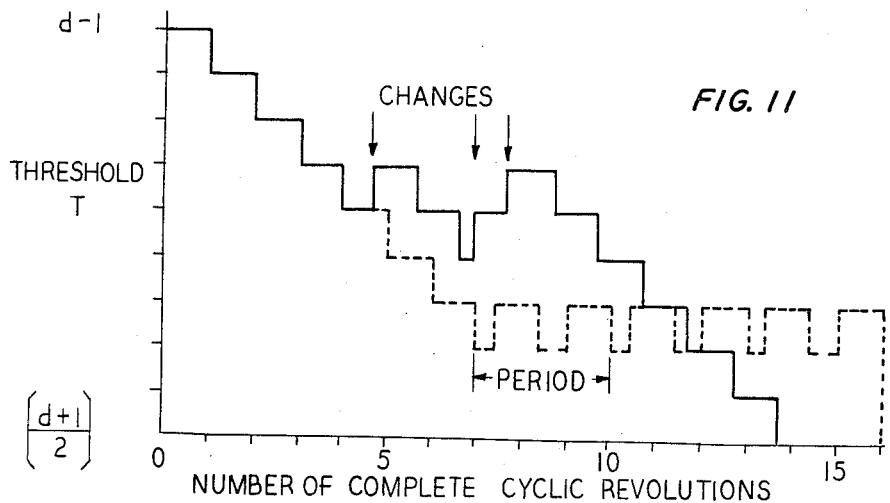

FIGS. 5A through 5E list a number of block codes of the type embodied in systems made in accordance with this invention;

FIG. 6 specifies the parity check groups of one particular novel block code formulated in accordance with the principles of the present invention;

FIGS. 7, 8 and 9 are tabular listings which are helpful in explaining the operation of the fixed-threshold decoder shown in FIG. 2; and FIGS. 10 and 11 illustrate the mode of operation of the variable-threshold decoder depicted in FIG. 3.

An understanding of what is meant by the terms quasi-cyclic and self-orthogonal is essential to a clear and complete comprehension of the details of the present invention. Accordingly, before proceeding to a detailed description of various specific illustrative systems made in accordance with the principles of this invention, there is presented hereinbelow a discussion of several matters of background interest to the coding techniques embodied in the illustrative systems.

A quasi-cyclic $(n, k)$ code is defined as a linear code of length $n=mn_0$ and efficiency $R=k/n$ which possesses the following properties: (i) each $n_0$-digit section (subblock) of a code word is composed of $k_0=R_0n_0$ information digits followed by $n_0-k_0$ parity check digits, and (ii) each cyclic shift of a code word by $n_0$ digits yields another code word. Condition (ii) is equivalent to requiring that each of the $m$ sets of $n_0-k_0$ parity digits checks the information digits in the same positions relative to itself. That is, if a given parity digit checks the information digits in positions $i_1, i_2 \ldots i_j$, then the corresponding parity digit in the next subblock checks positions $(i_1+n_0)$ mod $n$, $(i_2+n_0)$ mod $n \ldots (i_j+n_0)$ mod $n$.

If the parity check rules of a code are chosen such that no two information digits are checked by more than one parity digit, then the code is said to be self-orthogonal. If each information digit is checked by at least $d-1$ parity checks, then it can be shown that a self-orthogonal code has minimum distance of at least $d$. (In this connection, see Threshold Decoding, by J. L. Massey, MIT Press, 1963.) Since each information digit is assumed to be of identical importance, there is little point in having more than $d-1$ checks on any information digit, if some digits are checked by exactly $d-1$ parity checks. Consequently, in what follows, each information digit in a distance $d$ code will be checked by exactly $d-1$ parity checks.

Since the condition for self-orthogonality is that no pair of information symbols be checked by more than one parity symbol, no pair of parity checks can have more than one information digit in common. Since each of the $k$ information digits is checked by $d-1$ parity symbols, the number of pairs of parity symbols cannot be less than $$k\left(\frac{d-1}{2}\right)$$

That is, $$\left(\frac{n-k}{2}\right) \geq k\left(\frac{d-1}{2}\right) \quad (1)$$

Consider a quasi-cyclic self-orthogonal $(mn_0, mk_0)$ code with minimum distance $d$. Such a code is best described in terms of its parity check matrix H, shown in FIG. 4. Each row of this $m(n_0-k_0)$-by-$mn_0$ matrix represents a single parity check equation. The leftmost $n_0-k_0$ positions in each $n_0$-digit subblock correspond to parity check digits. The other $k_0$ positions correspond to information digits. For simplicity no parity digit checks any other parity digit. Thus, for example, the only subblock in the first row in which a "1" occurs in the leftmost $n_0-k_0$ positions is the first one.

Each row and column of FIG. 4 divides naturally into $m$ subblocks. Thus the matrix divides into $m^2$ cells. A position in the matrix will be specified by an ordered 4-tuple $(w, x, y, z)$ where $w$=row subblock number; $0 \leq w \leq m-1$
$x$=position in row subblocks; $1 \leq x \leq n_0$ \quad (2)
$y$=column subblock number; $0 \leq y \leq m-1$
$z$=position in column subblock; $1 \leq z \leq n_0-k_0$ The binary symbol "1" or "0" in position $(w, x, y, z)$ is represented by the function $B(w, x, y, z)$. By the definition of a quasi-cyclic code, each row of the matrix is identical to the row $(n_o-k_o)$ rows above it shifted to the right by $n_o$ bits. That is, $$B(w, x, y, z) = B(w+i, x, y+i, z) \qquad (3)$$

for all values of the four coordinates. Clearly if either $w+i$ or $y+i$ exceeds the modulus $m$, it is to be reduced modulo $m$.

Consider the parity check equation represented by the first row of H. It can be specified by a set of integers chosen from the set $\{1, 2 \ldots mk_o\}$ which corresponds to the information digits which it checks. More conveniently, it can be represented by $k_o$ sets of integers chosen from the set $\{0, 1, 2 \ldots m-1\}$. The $i$th of these sets specifies the subblocks in which the parity digit checks the $i$th information symbol. Since there are $n_o-k_o$ parity checks per subblock, and since the code is quasi-cyclic, the code is completely specified by $(n_o-k_o)k_o$ sets of integers chosen from the integers modulo $m$. In general, any choice of these sets will suffice to specify a quasi-cyclic $(mn_o, mk_o)$ code. However, if the code is also to be self-orthogonal and have minimum distance $d$, certain restrictions are necessarily placed on the sets.

A necessary condition for the code to have minimum distance $d$ is that each information symbol be involved in at least $d-1$ equations. This is equivalent to the requirement that the sum of the orders of each of the $(n_o-k_o)$ sets corresponding to a particular information position in the subblock have a total order of at least $d-1$ for each of the $k_o$ information positions. Although it is not necessary, it is advantageous that each of the $n_o-k_o$ sets in a collection have the same order, i.e., $d-1/(n_o-k_o)$. Herein only codes for which this is so will be considered. Also, since there is no point in checking some information symbols more times than others, it will be required that the sum of the orders be exactly $d-1$.

In general it can be shown that a quasi-cyclic self-orthogonal $(mn_o, mk_o)$ code with minimum distance $d$ is completely specified by $(n_o-k_o)k_o$ disjoint difference sets of order $(d-1)/(n_o-k_o)$, provided $k_o$ or $n_o-k_o=1$. Thus, the problem of finding good quasi-cyclic self-orthogonal codes with efficiency $$\frac{1}{n_o} \text{ or } \frac{n_o-1}{n_o}$$

is reduced to the problem of finding disjoint difference sets.

A difference set of order $S$ and modulus $m \geq S(S-1)+1$ is defined as a collection of $S$ integers chosen from the set $\{0, 1 \ldots m-1\}$ such that no two of the $S(S-1)$ differences modulo $m$ are identical. If $m = S(S-1)+1$, then for any non-zero integer $n<m$ there is exactly one pair of elements in the difference set such that their difference is congruent to $n$ modulo $m$. Such a set is called a perfect difference set. J. Singer in "A Theorem in Finite Projective Geometry and Some Applications to Number Theory," AMS Trans., vol. 43, 377–385, (1938), has shown how to construct such sets when $S=p^n+1$, $p$ prime, while T. A. Evans and H. B. Mann in "On Simple Difference Sets," Sankhya, vol. 11, 464–481, (1955), have shown that a perfect difference set cannot be constructed for any other value of $S \leq 1600$.

The order of the set of differences associated with a difference set of order $S$ is $S(S-1)$. If two sets of differences have no element in common they are said to be disjoint. Two difference sets are said to be disjoint if their sets of differences are disjoint.

If one difference set can be obtained from another by adding a particular integer to each element of the original set, the two difference sets are said to be equivalent. Clearly two such sets have identical sets of differences.

Any perfect difference set of order $p^n+1$ is equivalent to one set containing the integers 0 and 1, i.e., a normalized perfect difference set. All perfect difference sets of a given order can be obtained from a given perfect difference set of that order by the set of transformations $e_2 = e_1 a+b$ where $(a, p^{2n}+p^n+1) = 1$, $(a,p)=1$, $e_1$ is an element of the original set and $e_2$ is an element of the derived set.

Various procedures for constructing sets of this type are available. Three illustrative such constructions for this purpose are specified below:

Construction 1: A perfect difference set of order $p^n+1$ specifies a quasi-cyclic self-orthogonal code with efficiency ½ and minimum distance $p^n+2$. Furthermore, since the set of differences is dense on the integers $1, 2, \ldots p^{2n}+p^n+1$, the code has length $$2(p^{2n}+p^n+1)$$

and thus is optimal.

Construction 2: The $k_o$ difference sets $(0, 1)$, $(0, 2) \ldots (0, k_o)$ specify a quasi-cyclic self-orthogonal code with efficiency $k_o/(k_o+1)$ and minimum distance three. Clearly, if $m=2k_o+1$, the sets of differences are disjoint. Since $n=(k_o+1)m=(2k_o+v)(k_o+1)$, the code is optimal.

Construction 3: An optimal code with $d=4$ can be constructed for any value of $k_o$ for which $m=6k_o+1$ is prime.

In accordance with the principles of the present invention many different codes may be formulated. The essential parameters of ten such codes are listed in FIG. 5A. Each of these codes is specified in terms of its distance $d$, its block length $n$, and a set of numbers in parentheses designated as a check digit specifier. For all the listed codes R equals ½. In other words, the specific block structure of each encoded information sequence includes the same number of information and parity check digits. The first-listed code of FIG. 5A, characterized by a distance property of three, has embodied in it the capability to correct any single erroneous digit that may occur in a block or word of six information and parity check digits. Each such code block comprises three information digits designated I1, I2 and I3 and three parity check digits C1, C2 and C3. The manner in which the check digits C1, C2 and C3 are derived from each 3-digit information word is exactly indicated by the associated check digit specifier. (1, 2). This specifier prescribes that the first check digit of each redundant 6-digit block of the first-listed code be formed in accordance with the following expression, wherein addition is modulo 2.

$$C1 = I1 + I2 \qquad (4)$$

The expression for C2 is formed simply by incrementing by one all the subscripts of Equation 4. (If any subscript exceeds $m$, it is to be reduced modulo $m$. In the specific case considered herein $n$ equals 6, $n_o$ equals 2 and $m$ equals 3.) Hence, $$C2 = I2 + I3 \qquad (5)$$

In addition, modification of the subscripts of (5) gives the following expression for C3:

$$C3 = I3 + I1 \qquad (6)$$

If, for example, the 3-digit information word I1 I2 I3=110 is encoded in accordance with the parity relationships of (4) through (6), it is apparent that the corresponding 3-digit parity check digit sequence C1 C2 C3 would be 011. Each of the six possible non-zero 3-digit information words also has associated therewith a corresponding 3-digit check sequence which is calculated with the aid of expressions (4) through (6).

The quasi-cyclic nature of the 6-digit redundant information sequences described above is evident by considering that each such sequence is structured in the form C1 I1 C2 I2 C3 I3. For the assumed case in which I1 I2 I3 equals 110, the structure of the corresponding redundant 6-digit sequence is 011110. A one-digit cyclic permutation of this sequence gives the shifted sequence 001111 which by inspection is seen to include check digits that do not satisfy the above relationships (4) through (6). In other words, this shifted sequence is not an allowable element of the code listed in the top row of FIG. 5A. However, if each sequence of the form C1 I1 C2 I2 C3 I3 is cyclically shifted by two digits ($n_o$=2) the resulting sequence is found to be an allowable code element.

The self-orthogonal nature of the above-described 6-digit sequences may be observed by setting forth expressions (4) through (6) in the following way:

$$C1 = I1 + I2$$
$$C2 = I2 + I3 \quad (7)$$
$$C3 = I1 + I3$$

Inspection of (7) shows that I1 is common to the check groups that include C1 and C3 but that no other information digit is common thereto. Additionally, I2 is the only information digit common to the check groups that include C1 and C2, and I3 is the only information digit common to the check groups that include C2 and C3.

It is seen from (7) that the reception of a single erroneous information digit results in a corresponding unique pattern of check digits being in error. For example, if I1 is received in error, C1 and C3 as recalculated at the decoder will not satisfy the expressions specified by (4) and (6). Similarly, if I2 is received in error, C1 and C2 as recalculated will not satisfy (4) and (5). If I3 is received in error, C2 and C3 as recalculated will not satisfy (5) and (6). In accordance with the principles of the present invention, an easily implemented decoding strategy directly based on these relationships is embodied in a novel error control system.

FIGS. 5B through 5E list the essential parameters of other illustrative codes formulated in accordance with the principles of the present invention. These additional codes are characterized by efficiencies of ⅓ and ⅔ (FIG. 5B), ¼ and ¾ (FIG. 5C), ⅕ and ⅘ (FIG. 5D) and ⅙ and ⅚ (FIG. 5E). Many other quasi-cyclic self-orthogonal codes, not specifically represented in the drawing, may be devised in accordance with the concepts described herein.

Figure 1:
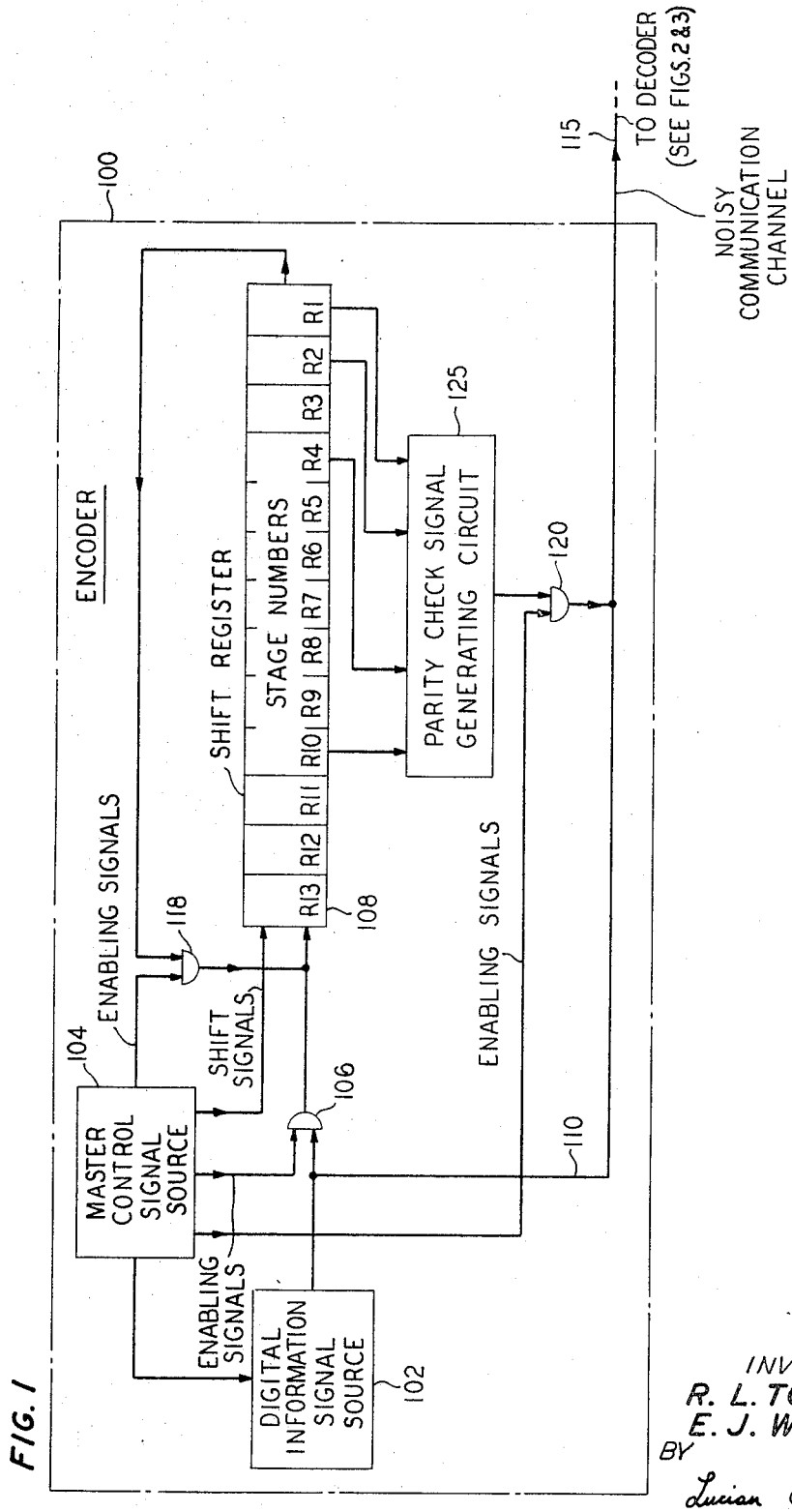
FIG. 1 depicts a specific illustrative block code encoder made in accordance with the principles of the present invention.

FIG. 1 shows a specific illustrative encoder made in accordance with this invention. In the interest of generalizing the presentation of the principles of this invention, the encoder 100 shown in FIG. 1 does not embody therein the code described in detail above and listed in the first row of FIG. 5A. Instead, the FIG. 1 encoder is adapted to encode information sequences to form elements of the code listed in the third row of FIG. 5A. This code is characterized by a distance $d$ of five and is therefore capable of double error correction. Each element or word of this (26, 13) code includes 13 information digits and 13 parity check digits.

The 13 parity relationships according to which the FIG. 1 encoder generates check digits are represented in FIG. 6. Each of these 13 check digits C1 through C13 is derived from modulo 2 addition of $d-1$ or four associated information digits. The associated information digits of a particular check digit are indicated in FIG. 6 by "1" symbols under the appropriate information digit designations I1 through I13. Thus, for example, the check digit C1 is indicated as being obtained from the modulo 2 addition of the binary values of information digits I1, I2, I4 and I10. In other terms:

$$C1 = I1 + I2 + I4 + I10 \quad (8)$$

In an identical manner, the other 12 parity-determining equations are obtainable by inspection of FIG. 6.

The specific encoder 100 shown in FIG. 1 includes a digital information signal source 102 which, under the control of signals applied thereto form a master control signal source 104, serially applies information digits via a gate 106 to a $k$-stage shift register 108. The source 102 is assumed to be capable of generating $2^k$ different $k$-digit binary sequences. For illustrative purposes, $k$ is assumed herein to be 13. Hence, the source 102 is considered to be capable of generating $2^{13}$ or 8,192 different 13-digit information words.

During the generation of a 13-digit word by the information source 102, the gate 106 is enabled by the master control source 104, whereby the digits of the information word are applied in sequence to the register 108. These digits are successively moved through the stages of the register 108 by shift signals applied to the register from the source 104. At the same time, the output of the information source 102 is applied via a lead 110 directly to a noisy or error-prone communication channel 115 for transmission to associated decoders (shown in FIGS. 2 and 3). During this time period, neither one of two associated gates 118 and 120 is enabled.

After the occurrence of 13 shift signals, the individual digits I1 through I13 of the 13-digit information word supplied by the source 102 of FIG. 1 are respectively stored in stages R1 through R13 of the register 108. At this time the master control source 104 momentarily enables the gate 120. As a result, the first output signal provided by a parity check generating circuit 125 is applied to the channel 115 to appear thereon immediately subsequent to the aforementioned 13 information digit signals. This first output signal is the check digit C1 which, according to FIG. 6 and expression (8), is derived from modulo 2 addition of I1, I2, I4 and I10. To accomplish this addition, the parity circuit 125 has applied thereto as inputs the information digits respectively stored in stages R1, R2, R4 and R10 of the register 108. It is apparent that the circuit 125 may comprise a conventional 4-input EXCLUSIVE-OR circuit.

Subsequent to the generation of C1, an additional shift signal is applied to the register 108 of FIG. 1. Also, the gate 118 is then enabled by the source 104. Consequently, information digits I2 through I13 are moved into stages R1 through R12 respectively and, at the same time, I1 is fed back through the enabled gate 118 to be stored in stage R13. Therefore, the inputs to the parity circuit 125 during a second check digit generating interval are the information digits I2, I3, I5 and I11. Examination of the second row of FIG. 6 shows that these are precisely the information digits that determine the binary value of C2. Hence, the enablement at this time of the gate 120 results in a signal representative of the check digit C2 being applied to the noisy channel 115.

In a manner identical to that set forth above, the additional check digits C3 through C13 are formed in accordance with the relationships represented in FIG. 6. Furthermore, these additional check digits are appended to the digits previously applied to the channel 115. The resulting 26-digit redundant sequence comprises one element or block of the novel quasi-cyclic self-orthogonal code described herein.

FIG. 2 depicts a specific illustrative decoder 200 which is adapted to process a redundant word of the type supplied by the FIG. 1 encoder and to automatically correct certain limited classes of error occurrences therein. Each word received from the channel 115 is applied to two gates 202 and 204. Only the gate 202 is enabled (by signals from a control signal source 205) during the time in which the information digits I1 through I13 are being received from the channel 115. The digits I1 through I13 are applied via the gate 202 to the input stage R13 of an information digit shift register 206 and are moved therethrough in a digit-by-digit manner by shift signals supplied by the control source 205.

After 13 shift operations the received information digits I1 through I13 are respectively stored in the stages R1 through R13 of the register 206 of FIG. 2. At this point, the gate 202 is disabled and the gate 204 is enabled, whereby the next received digit (C1) is applied via the gate 204 to an EXCLUSIVE-OR circuit 208. The other input to the circuit 208 is derived from a parity check signal generating circuit 210 whose inputs are the information digits stored in the stages R1, R2, R4 and R10 of the register 206. The circuit 210 is adapted to recalculate check digits from the received information digit sequence in accordance with exactly the same parity relationships which are embodied in the encoding circuitry shown in FIG. 1. This is accomplished by successive shifting and feedback of the digits stored in the register 206 in a manner identical to that described above for the encoder 100. Thus, if no errors are present in the received redundant sequence, the 13 successive parity signals generated by the circuit 210 will be identical to the digits C1 through C13 received from the channel 115. In that case, the output of the EXCLUSIVE-OR circuit 208 would be 13 "0" signals.

The output of the EXCLUSIVE-OR circuit 208 shown in FIG. 2 is applied in a serial manner to a syndrome shift register 212. Under the control of shift signals supplied by the control source 205, the 13-digit output of the circuit 208 eventually stored in the 13-stage register 212. The number and positions of any "1" signals in this 13-digit syndrome word are uniquely indicative of the location of errors in the received redundant sequence, provided a correctable error pattern occurred.

A threshold circuit 215, illustratively a conventional majority logic circuit, is connected to selected stages of the syndrome shift register 212. The selected stages are those that store digits derived from the parity signals of the check group that includes I1 as the common digit thereof. As seen from FIG. 6, these parity signals are C1, C5, C11 and C13. Hence, the threshold circuit 215 is connected to the stages S1, S5, S11 and S13 of the syndrome register 212.

For the specific example considered herein, the threshold of the majority circuit 215 is fixed at 3. In other words, the circuit 215 provides an output correction signal on a lead 217 only if 3 or 4 of the inputs thereto are "1" signals. The reason for this is apparent from a consideration of the mode of operation of the decoder 200 in processing the first information digit I1. Assume that I1 was received in error and that all other information and check digits were received correctly. In such a case, the parity signals recalculated by the generating circuit 210 include the respective inverses of the received parity signals C1, C5, C11 and C13. Therefore, a "1" signal would be stored in each of the stages S1, S5, S11 and S13 of the register 212. Obviously the threshold circuit 215 should respond to this condition by providing an output correction signal on the lead 217. The control signal source 205 causes this correction signal to be gated through a gate 219 at the same time that information digit I1 is gated through a gate 221. As a result, I1 is inverted (corrected) as it propagates through an output EXCLUSIVE-OR circuit 223. In this way, a corrected version of I1 is delivered to an associated output utilization circuit 225.

To take another situation, assume that I1 and one other received digit, say I2, are the only erroneously-received signals. Both I1 and I2 enter into the calculation of check digit C1. In effect these errors occurring together cancel each other out. Hence, the version of C1 that is recalculated by the generating circuit 210 of the decoder 200 would be identical to the received value of C1. Therefore, the stage S1 of the syndrome shift register 212 would not have a "1" signal stored therein. However, due to the self-orthogonal nature of the novel codes employed therein, I2 does not enter into the determination of any other of the check signals C5, C11 and C13. Consequently, each of the stages S5, S11 and S13 would, as in the single error example, have a "1" signal stored therein. In this case too, the circuit 215 should provide an output signal to effect correction of I1 as I1 is applied to the EXCLUSIVE-OR circuit 223.

Processing of the information digit I2 in the decoder 200 shown in FIG. 2 is carried out in the following manner. The contents of the syndrome register 212 is shifted forward (to the right) by one stage, with the signal stored in the stage S1 being fed back to the input stage S13. At this point, the stages S1, S5, S11 and S13 contain therein representations derived from the parity signals of the check group that includes I2 as the common digit thereof. As before, if 3 or 4 of these representations are "1" signals, the threshold circuit 215 provides an output correction signal which is applied by the gate 219 to the EXCLUSIVE-OR circuit 223 in time coincidence with the outpulsing of I2 from the register 206 and the gate 221. In an exactly similar way the digits I3 through I13 are subsequently processed by the decoder 200.

The mode of operation of the decoder 200 in automatically correcting two particular erroneously-received digits (for example, I1 and I4) is indicated in FIG. 7. The initial 13-digit contents of the syndrome shift register 212 is shown therein. This 13-digit sequence is derived by the circuitry described above and can be verified by inspection of FIG. 6. Below this initial 13-digit sequence are listed the 13 sequences which are processed by the threshold circuit 215 to determine whether or not the digits I1 through I13 respectively require correction. As explained above, this determination depends on the successive contents of the stages S1, S5, S11 and S13 of the syndrome shift register 212. The cross-hatched columns in FIG. 7 facilitate identification of the digits stored in those particular stages.

As is apparent from FIG. 7, the threshold of the circuit 212 of FIG. 2 is exceeded only during the time intervals in which I1 and I4 are being applied to the EXCLUSIVE-OR circuit 223 from the enabled gate 221. Accordingly, the digits I1 and I4 of the received information sequence I1 through I13 are automatically corrected before being applied to the utilization circuit 225. The other 11 information digits are passed to the circuit 225 in unmodified form.

The capabilities of the illustrative decoder 200 described above are not limited to automatic correction of a maximum of two erroneous information digits in each received redundant sequence. Some 3-digit error patterns are also automatically correctable thereby. However, still additional classes of 3-digit error patterns are not correctable by the illustrative equipment. If, for example, three information digits comprising an uncorrectable pattern should be received in error, the operation of the decoder 200 in attempting to correct the erroneous word is such as to completely garble the received information sequence. This is illustrated by FIG. 8 which represents the action of the decoder 200 in response to the receipt of a redundant sequence in which I1, I2 and I4 are received in error. As indicated in FIG. 8, the decoder would respond to such an error pattern by inverting all of the received information digits except I10. In this case the "corrected" word passed to the utilization circuit 225 of FIG. 2 would clearly be an erroneous replica of the corresponding information word supplied by the information source 102 of FIG. 1.

By making a novel and unique modification to the circuitry shown in FIG. 2, the error-correcting performance thereof can be extended to have the capability to correct many more 3-digit error patterns. This modification involves respectively inverting the digits stored in the stages S1, S5, S11 and S13 of the syndrome shift register 212 each time that a correction signal is applied to the EXCLUSIVE-OR circuit 223 by the gate 219. Illustratively the means for accomplishing this is a lead 230 connected to the output of the gate 219. By closing an associated switch 232, each correction signal is thereby applied to the stages S1, S5, S11 and S13 to respectively invert or complement the binary representations stored therein.

The unique capability of the modified FIG. 2 decoder to correct otherwise uncorrectable error patterns is illustrated by FIG. 9. Assume that the digits I1, I2 and I4 are again received in error. (Recall that FIG. 8 indicates that this error pattern is uncorrectable by the unmodified FIG. 2 decoder.) The 13-digit word initially stored in the syndrome register 212 includes four "1" signals in the stages S1, S5, S11 and S13. Hence, a correction signal is applied to the EXCLUSIVE-OR circuit 223 in time coincidence with the application thereto of information digit I1. This correction signal also results in the inversion of the four aforementioned "1" signals. The resulting sequence stored in the register 212 is represented in row No. 3 of FIG. 9. This resulting sequence is then shifted and permuted in the same manner described earlier, thereby to cause the sequence of row No. 4 to be stored in the register 212. This sequence includes three "1" signals in the stages S1, S5, S11 and S13. Hence, another correction signal is generated by the threshold circuit 215 and applied via the gate 219 to invert I2 as it passes through the EXCLUSIVE-OR circuit 223. In addition, this second correction signal causes the respective contents of S1, S5, S11 and S13 to be complemented, as indicated in row No. 5 of FIG. 9.

Subsequent operation of the modified decoder 200 depicted in FIG. 2 is represented by FIG. 9. As indicated therein, I4 is also automatically corrected. No additional correction signals are generated by the threshold circuit 215. It is therefore seen that the modified decoder 200 is in fact capable of processing a received sequence in many cases having three errors to supply a corrected version of the information digits thereof to the utilization circuit 225.

As mentioned above, not all 3-digit error patterns are correctable by the modified FIG. 2 decoder. For example, by following procedures exactly analogous to those specified above and represented in FIGS. 8 and 9, it can be easily shown that the receipt in error of I2, I3 and I5 cannot be corrected either by the unmodified or modified fixed-threshold decoder shown in FIG. 2. To correct such a pattern requires still another modification of the basic decoding techniques described in detail above.

FIG. 3 shows a so-called variable threshold decoder which is able to automatically correct error patterns which are outside the capabilities of the FIG. 2 arrangement. The FIG. 3 decoder differs from the circuitry described above in the essential respect that a threshold circuit 315 thereof is selectively controlled to exhibit an adjustable level which must be reached before the circuit supplies an output correction signal. Otherwise, the FIG. 3 configuration is substantially identical to the circuitry described above in connection with FIG. 2. Corresponding elements in the two figures are designated by the same reference numerals.

The decoding strategy of the illustrative embodiment depicted in FIG. 3 is as follows. Initially the threshold level of the circuit 315 is set equal to $d-1$ or 4. Then the registers 206 and 212 are shifted cyclically $n-k$ or 13 times, or until the circuit 315 provides an output correction signal. If no correction signal appears after $n-k$ shifts, the threshold of the circuit 315 is lowered by one, and another complete revolution comprising $n-k$ shifts is attempted. If at any time during a revolution a correction signal is generated, the threshold of the circuit 315 is increased (to a maximum value of $d-1$) and a new shifting revolution is commenced. (Consider a code with efficiency $K_0/n_0$. A maximum of $k_0$ corrections is made at one time. Thus, the threshold would be raised by at most $k_0$ units at one time.) Eventually, one of two things will occur. Either the threshold will drop to $$\frac{d+1}{2}$$

and remain there, or the threshold will enter a limit cycle wherein it changes repetitively between two or more levels. These alternatives are depicted graphically in FIG. 11.

In the second-mentioned case, represented in FIG. 11 by dashed lines, the threshold is forced to $$\frac{d+1}{2}$$

after a suitable number N of complete revolutions. This assures that decoding will be completed within a finite period of time. As a practical matter, $3(d-1)$ complete revolutions will suffice to decode all correctable error patterns. Consequently N is illustratively set to this value.

The decoding strategy set forth above and the circuitry required to implement it will be apparent after a particular decoding example is explained in detail with the aid of FIGS. 3 and 10. Assume that the digits I2, I3 and I5 of a 26-digit redundant sequence are received in error by the decoder 300, and that all the other digits of the sequence are received in their correct (originally-transmitted) form. This received sequence is initially processed by the decoder 300 (in exactly the same way characteristic of the FIG. 2 decoder 200) to form a 13-digit syndrome word that is stored in the respective stages of the syndrome shift register 212. At this point the state of an $(n-k)$-count counter circuit 327 is set by the control source 205 to zero and, in addition, a threshold setting circuit 330 is signaled by the source 205 to initially establish the threshold of the circuit 315 at 4. In other words, the circuit 315 is set to a state wherein it will provide an output correction signal only if all four inputs applied thereto are "1" signals. Next the gate 219 is enabled, whereby the circuit 315 passes a correction signal therethrough to a lead 335 and the EXCLUSIVE-OR circuit 325 if all four of the stages S1, S5, S11 and S13 contain "1" signals therein. Accordingly, for the particular error pattern assumed above, the circuit 315 does not generate a correction signal at this point in the overall cycle of operation (see row No. 2 of FIG. 10).

In time coincidence with the enablement of the gate 219, the information digit shift register 206 is permuted once. This is done by the control source 205 supplying an enabling signal to a gate 337 and a shift signal to the register 206. In this way, the information digit I1 formerly stored in the stage R1 of the register 206 is fed back via the enabled gate 337 to the EXCLUSIVE-OR circuit 325. Hence I1 is not changed as it is applied via the circuit 325 to the stage R13 of the register 206.

Subsequently a shift signal is applied to the syndrome register 212, whereby the sequence stored therein is permitted to the form represented in row No. 3 of FIG. 10. This shift signal is also applied to the circuit 327 to increase the count registered therein by one. The sequence shown in row No. 3 includes four "1" representations in the stages S1, S5, S11 and S13 of the register 212. Consequently the threshold circuit 315 supplies an output correction signal to the gate 219. This correction signal is subsequently passed through the gate 219 to accomplish four different purposes. First, it is applied to the EXCLUSIVE-OR circuit 325 to cause the erroneous digit I2 to be inverted as it propagates between the last and first stages of the shift register 206. Second, the correction signal is applied via a lead 340 to the stages S1, S5, S11 and S13 to respectively invert the binary contents thereof. The resulting contents of the register 212 is listed in row No. 4 of FIG. 10. Third, the correction signal is applied to the circuit 327 to reset the count therein to zero. Fourth, the correction signal is applied to the circuit 330 to cause the threshold set thereby to be raised by one step (but not beyond a maximum value of $d-1$ or 4). In the specific case considered herein, the threshold of the circuit 315 as established by the circuit 330 therefore remains at 4.

After the occurrence of the correction signal mentioned above and indicated in row No. 3 of FIG. 10, another complete shifting cycle of operation of the registers 206 and 212 commences. Each shift pulse applied to the register 212 is counted by the circuit 327. After 13 such shifts without the generation of another correction signal (see rows 5 through 17 of FIG. 10) the counter circuit 327 resets itself to zero and, in addition, applies a signal to the circuit 330 to lower by one step the threshold established thereby for the circuit 315. This lowering of the threshold of the circuit 315 is represented in row No. 18 of FIG. 10. At this lower threshold the circuit 315 responds to the multi-digit syndrome word stored in the register 212 to generate an output correction signal. As a result, I3 is corrected as it propagates through the EXCLUSIVE-OR circuit 325. Also, the syndrome digits stored in S1, S5, S11 and S13 are inverted (see row No. 19). In addition, the counter circuit 327 is reset to zero. Moreover, the threshold level of the circuit 315 is raised to 4.

The commencement of still another shifting cycle of operation of the illustrative decoder shown in FIG. 3 is represented in row No. 20 of FIG. 10. In this cycle I5 is corrected (see row No. 21). Thereafter, the contents of the syndrome shift register 212 is an all-zero word (row No. 22). Accordingly, no other correction signals are subsequently generated, and the threshold of the circuit 315 is eventually lowered to $$\frac{d+1}{2}$$

or 3, where it remains until the complete cyclic operation represented in FIG. 11 is terminated. At that point, an output gate 221 is enabled by the control signal source 205 to apply in sequence to an output utilization circuit 225 the corrected version of the received information digits I1 through I13.

Thus, there have been described in detail herein several illustrative embodiments of the principles of the present invention. As indicated, these embodiments are based on a new class of linear block codes whose unique quasi-cyclic and self-orthogonal properties enable the encoding and decoding circuitry therefor to be implemented in a remarkably simple manner. The various specific embodiments shown in the drawing are capable of automatically correcting a large number of (but not all possible) 3-digit error occurrences. In addition, it is significant to note that some higher-weight error patterns are also correctable thereby. For example, the fixed threshold decoder shown in FIG. 2 (specifically, the embodiment thereof that does not include feedback via the switch 232) possesses the capability to automatically correct a 4-digit pattern such as the one that includes the digits C1, C2, C3 and C5 received in error.

The implementation of the various gates, registers and other circuits included in the illustrative arrangements of FIGS. 1 through 3 are considered, in view of the specific end requirements set forth above, to be clearly within the skill of the art and are accordingly not set forth in detail herein. For example, the threshold circuit 315 may be a conventional biased magnetic core switching arrangement. For such an arrangement, the threshold setting circuit 330 may comprise a controlled variable bias source for determining the threshold for switching of the associated core. Other types of threshold circuits including transistors and diodes are well-known in the art and are also well suited for inclusion in the arrangements described herein.

It is to be understood that the above-described arrangements are only illustrative of the application of the principles of the present invention. In accordance with these principles numerous other arrangements may be devised by those skilled in the art without departing from the spirit and scope of the invention. For example, each sub-block of a redundant block encoded in accordance with the invention may be structured to comprise $k_0$ information digits and a corresponding plurality $n_0-k_0$ of parity check digits, or vice versa. To accomplish the former, the encoder 100 shown in FIG. 1 is modified to include a plurality of parity check signal generating circuits each connected to a different selected set of the stages of the shift register 108. In such a case, the outputs of these plural generating circuits are applied in sequence to the channel 115 for each single shift of the register 108. The parity digit recalculating portion of the decoding circuitry of such an alternative arrangement is modified in a corresponding way.

What is claimed is:

1. In combination in a block code error control system which includes an error-prone communication channel, means for supplying a $k$-digit information sequence, encoding means responsive to said sequence for generating, in accordance with a quasi-cyclic self-orthogonal block code, a parity check sequence $n-k$ digits in length, said encoding means comprising a multistage information shift register including input and output stages and means for successively cyclically permuting the digits of said information sequence in said register by successively directly applying each information digit stored in said output stage to said input stage in unaltered form while shifting the information sequence through said register in a stage-by-stage manner, means for combining said information and check sequences and for applying them to one end of said channel, and means connected to the other end of said channel for automatically correcting specified classes of erroneous digits contained in said information and check sequences.

2. Apparatus for processing a block of information digits and delivering an exact replica of the block to an output utilization circuit despite the occurrence during processing of random errors in the digits thereof,
said apparatus comprising means responsive to said block of information digits for deriving therefrom a parity check digit sequence which is formed in accordance with a quasi-cyclic self-orthogonal code,
said means for deriving comprising a multistage information shift register including input and output stages and means for successively cyclically permuting the digits of said information block by successively directly applying each information digit stored in said output stage to said input stage in unaltered form while shifting the information block through said register in a stage-by-stage manner,
means for combining said parity sequence with said information digit block to form a redundant block,
means for propagating said block to said utilization circuit,
and means interposed between said propagating means and said utilization circuit for deriving from said redundant block signals for automatically correcting any erroneous digits in said information block before delivery thereof to said utilization circuit.

3. In combination in an encoder,
a $k$-stage information digit shift register including input and output stages,
means for applying the respective digits of a $k$-digit information sequence to said $k$-stages,
a direct electrical connection between said input and output stages,
means including said connection for successively permuting the contents of said shift register by successively directly applying each information digit stored in said output stage to said input stage in unaltered form while shifting the information sequence through said register in a stage-by-stage manner,
and means connected to selected stages of said register for calculating therefrom a parity check digit in accordance with a quasi-cyclic self-orthogonal code each time that said register is permuted.

4. In combination in an automatic error-control system,
a multistage shift register including input and output stages,
a direct electrical path between said input and output stages, means for applying a multidigit information sequence to said register, means including said path for successively permuting the sequence stored in said register by successively directly applying each information digit stored in said output stage to said input stage in unaltered form while shifting the information sequence through said register in a stage-by-stage manner, means connected to selected ones of said stages for generating a parity check digit sequence in accordance with a quasi-cyclic self-orthogonal code, and means for combining said information and parity sequences and applying them to one end of a communication channel.

5. A combination as in claim 4 further including a decoder connected to the other end of said channel, said decoder comprising means including an information digit shift register responsive to said information digit sequence for recalculating a check digit sequence therefrom in accordance with exactly the same parity relationships as those imposed by said generating means, means for combining by modulo 2 addition said recalculated sequence with a corresponding check sequence received at the other end of said channel thereby to form a syndrome word, a multistage syndrome shift register including input and output stages, means for applying the digits of said syndrome word to the respective stages of said syndrome shift register, means for establishing a direct electrical connection between said input and output stages, means including said establishing means for successively permuting the sequence stored in said syndrome shift register, means connected to selected stages of said syndrome shift register for providing an output correction signal whenever during said permuting at least a predetermined number of the selected stages contain therein representations of a particular binary character, means for outpulsing said information digits in sequence from said information digit shift register, means for applying to said outpulsing means any correction signals supplied by said providing means, and means for synchronizing the outpulsing of said information digits with the successive permuting of said syndrome sequence.

6. A combination as in claim 5 further including means responsive to the occurrence of a correction signal for respectively inverting the contents of the selected stages of said syndrome shift register.

7. A combination as in claim 4 further including a decoder connected to the other end of said channel, said decoder comprising means including an information digit shift register responsive to said information digit sequence for recalculating a check digit sequence therefrom in accordance with exactly the same parity relationships as those imposed by said generating means, means for combining by modulo 2 addition said recalculated sequence with the corresponding check sequence received at the other end of said channel thereby to form a syndrome word, a multistage syndrome shift register including input and output stages, means for applying the digits of said syndrome word to the respective stages of said syndrome shift register, means for establishing a direct electrical connection between said input and output stages, means including said establishing means for successively permuting the sequence stored in said syndrome shift register, means connected to selected stages of said syndrome shift register for providing an output correction signal whenever during said permuting at least a predetermined number of the selected stages contain therein representations of a particular binary character, means connected to said providing means for adjustably controlling the number of stages of said syndrome shift register which must contain representations of a particular binary character for said providing means to supply a correction signal, means including a feedback path between input and output stages of said information digit shift register for successively permuting the contents thereof in synchronism with the permuting of the contents of said syndrome shift register, said feedback path including an EXCLUSIVE-OR circuit, means for applying to said EXCLUSIVE-OR circuit any correction signals supplied by said providing means thereby to correct information digits as they are propagated through said EXCLUSIVE-OR circuit, means responsive to any such correction signals for respectively inverting the contents of the selected stages of said syndrome shift register, and means responsive to any correction signal supplied by said providing means for causing said controlling means to raise by one the number of said selected syndrome register stages which must contain representations of the aforementioned particular binary character for said providing means to supply a correction signal.

8. In combination in a decoder adapted to automatically correct erroneous digits included in a redundant sequence which has been encoded in accordance with a quasi-cyclic self-orthogonal code, multistage shift register means including input and output stages for storing the respective digits of a syndrome word, a direct electrical connection between said input and output stages, means including said connection for successively permuting the contents of said shift register, and threshold means connected to selected ones of said shift register stages for providing a correction signal each time that said register is permuted if at least a predetermined number of said selected stages have stored therein representations of a particular binary character.

9. A combination as in claim 8 wherein said threshold means comprises a majority logic circuit.

10. A combination as in claim 8 further including means for varying the response level of said threshold means.

11. A combination as in claim 10 wherein said varying means includes a counter circuit responsive to the receipt of a set of signals indicative of a complete permutation of said shift register for lowering the response level of said threshold means.

12. A combination as in claim 11 wherein said varying means further includes means responsive to the occurence of a correction signal for raising the response level of said threshold means.

13. An error control decoder comprising, means including input and output stages for storing a multidigit syndrome sequence, means including a feedback path directly interconnecting said input and output stages for cyclically permuting the sequence contained in said storing means by applying shift signals thereto, threshold circuit means connected to d−1 selected stages of said storing means, where $d$ is the distance property of the code whose elements said decoder is adapted to process, means connected to said threshold circuit means for setting the threshold level thereof, a counter circuit responsive to the occurrence of said shift signals for applying a lowering signal to said setting means in response to the registration in said counter circuit of a predetermined number of shift signals, and means connected to the output of said threshold circuit means and responsive to the occurrence of a correction signal therefrom for applying a raising signal to said setting means and a reset signal to said counter circuit.

References Cited

UNITED STATES PATENTS

| | | | |
|---|---|---|---|
| 3,093,707 | 6/1963 | Nicholson et al. | 340—146.1 X |
| 3,162,837 | 12/1964 | Meggitt | 340—146.1 |
| 3,164,804 | 1/1965 | Burton et al. | 340—146.1 |
| 2,956,124 | 10/1960 | Hagelbarger | 340—146.1 X |
| 3,114,130 | 12/1963 | Abramson | 340—146.1 |
| 3,155,818 | 11/1964 | Goetz | 235—153 |
| 3,303,333 | 2/1967 | Massey | 235—153 |
| 3,373,404 | 3/1968 | Webb | 340—146.1 |

MALCOLM A. MORRISON, Primary Examiner

CHARLES E. ATKINSON, Assistant Examiner

U.S. Cl. X.R.

325—41